United States Patent
Stingel, III et al.

(10) Patent No.: US 8,286,779 B2
(45) Date of Patent: *Oct. 16, 2012

(54) DAMPENED SPRING-OPERATED VERTICALLY ACCUMULATING CONTAINER STORAGE AND RETRIEVAL SYSTEM

(75) Inventors: Frederick J. Stingel, III, Asheville, NC (US); Ernest Emory Devlin, Jr., Candler, NC (US); John Robert French, Arden, NC (US)

(73) Assignee: Vertique, Inc., Arden, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,439

(22) Filed: Jun. 21, 2011

(65) Prior Publication Data

US 2012/0160790 A1   Jun. 28, 2012

Related U.S. Application Data

(63) Continuation of application No. 12/315,837, filed on Dec. 5, 2008, now Pat. No. 7,963,383.

(60) Provisional application No. 60/992,593, filed on Dec. 5, 2007.

(51) Int. Cl.
*B65G 1/00* (2006.01)

(52) U.S. Cl. .................. 198/347.1; 198/347.2; 414/276; 414/331.04

(58) Field of Classification Search ............... 198/347.1, 198/347.2, 799, 801; 414/331.04, 276, 331.01, 414/788.4, 791.6, 789.6
See application file for complete search history.

(56) References Cited

U.S. PATENT DOCUMENTS

| | | | | |
|---|---|---|---|---|
| 2,870,900 A * | 1/1959 | Will | ............................ | 198/801 |
| 3,498,478 A * | 3/1970 | Eliassen | .................... | 198/347.4 |
| 4,621,745 A * | 11/1986 | Grace | ......................... | 414/276 |
| 5,111,963 A | 5/1992 | Grace, Sr. | | |
| 5,236,104 A | 8/1993 | Stingel, Jr. et al. | | |
| 5,285,928 A | 2/1994 | Stingel, Jr. et al. | | |
| 5,636,966 A * | 6/1997 | Lyon et al. | ................. | 414/789.6 |
| 5,779,094 A | 7/1998 | Stingel, Jr. | | |
| 5,903,464 A * | 5/1999 | Stingel et al. | ............. | 198/347.1 |
| 5,934,864 A * | 8/1999 | Lyon et al. | ................. | 414/789.6 |
| 6,729,836 B2 * | 5/2004 | Stingel et al. | ............. | 198/347.1 |
| 7,007,791 B2 | 3/2006 | Stingel, III et al. | | |
| 7,184,855 B2 * | 2/2007 | Stingel et al. | ............. | 414/789.6 |
| 7,200,465 B2 * | 4/2007 | Stingel et al. | ............. | 414/788.4 |
| 7,401,709 B2 * | 7/2008 | Stingel et al. | ............. | 198/347.1 |

FOREIGN PATENT DOCUMENTS

EP        0184293        11/1988

\* cited by examiner

*Primary Examiner* — James R Bidwell
(74) *Attorney, Agent, or Firm* — Dority & Manning, P.A.

(57) ABSTRACT

A vertically accumulating storage and retrieval apparatus has a first and second plurality of substantially vertically spaced shelf assemblies supported by support structure. Each of the shelf assemblies includes a shelf tray for receiving, storing, and discharging containers. Spring biasing structure is provided for urging the shelf to the receiving position. Dampening structure dampens the movement of the shelf between the upwardly tilted receiving position and the downwardly tilted discharge position. A transfer control and transfer control linkage are provided for retaining the shelf when a shelf of a next lower shelf assembly is not prepared to receive a container, and allowing the shelf to move to the discharge position under the weight of a container disposed on the shelf when the shelf of the next lower shelf assembly is prepared to receive a container. A method for storing and retrieving containers is also disclosed.

13 Claims, 14 Drawing Sheets

DAMPENED SPRING-OPERATED VERTICALLY ACCUMULATING CONTAINER STORAGE AND RETRIEVAL SYSTEM

CROSS-REFERENCE TO RELATED APPLICATIONS

The present application is a Continuation of U.S. patent application Ser. No. 12/315,837 filed Dec. 5, 2008, now U.S. Pat. No. 7,963,383, issued Jun. 21, 2011 which claims the priority of U.S. Provisional Patent Application No. 60/992,593, filed Dec. 5, 2007, which is incorporated herein by reference in its entirety.

FIELD OF THE INVENTION

This invention relates generally to automated storage and retrieval systems, and is more specifically related to vertically accumulating container storage and retrieval systems.

BACKGROUND OF THE INVENTION

Vertically accumulating container storage and retrieval systems are know in the art. Exemplary systems are shown in Stingel et al., U.S. Pat. No. 6,729,836; Stingel et al, U.S. Pat. No. 7,200,465; and Stingel et al, U.S. Pat. No. 7,184,855; and Grace, U.S. Pat. No. 4,621,745. The disclosures of the patents are incorporated by reference. In such systems, a first plurality of substantially vertically spaced shelf assemblies is supported by support structure and a second plurality of substantially vertically spaced shelf assemblies is supported by support structure. Each shelf assembly includes a shelf tray for receiving, storing, and discharging containers. The shelf trays of the first plurality of shelf assemblies are substantially staggered vertically relative to the shelf trays of the second plurality of shelf assemblies, with the free ends of the trays of one plurality of shelf assemblies facing the free ends of the trays of the other plurality of shelf assemblies. Each shelf tray is mounted to its respective vertical support for pivotal movement at least between an upwardly tilted receiving position and a downwardly tilted discharge position. A transfer control is operatively connected to the shelf assembly and has a lock position retaining the shelf tray when a shelf tray of a next lower shelf assembly is not prepared to receive a container, and a release position, allowing the shelf to move to the discharge position under the weight of a container disposed on the shelf tray when the shelf tray of the next lower shelf assembly is prepared to receive a container. Containers move downward through the vertical stacks of shelf assemblies from side-to-side in a substantially downward back and forth fashion until a container has reached the lowest open container position.

Biasing is provided to urge the shelf trays to the upwardly tilted receiving position. The biasing has been accomplished by gas cylinders. Gas cylinders are susceptible to degradation due to loss of gas, as well as performance issues which are relative to the temperature of the gas. In a cold environment or during winter months, the performance of the gas cylinders can be markedly different from the performance of the cylinders during warmer months. Changes in gas cylinder performance affects the movement of containers through the towers and can result in unnecessary vibration or jarring of the containers. Replacement, repair, or adjustment of gas cylinders can be time consuming and expensive.

BRIEF DESCRIPTION OF THE DRAWINGS

There is shown in the drawings embodiments which are presently preferred, it being understood, however, that the invention can be embodied in other forms without departing from the spirit or essential attributes thereof.

DETAILED DESCRIPTION OF THE INVENTION

Figures 1A, 1B, 1C:
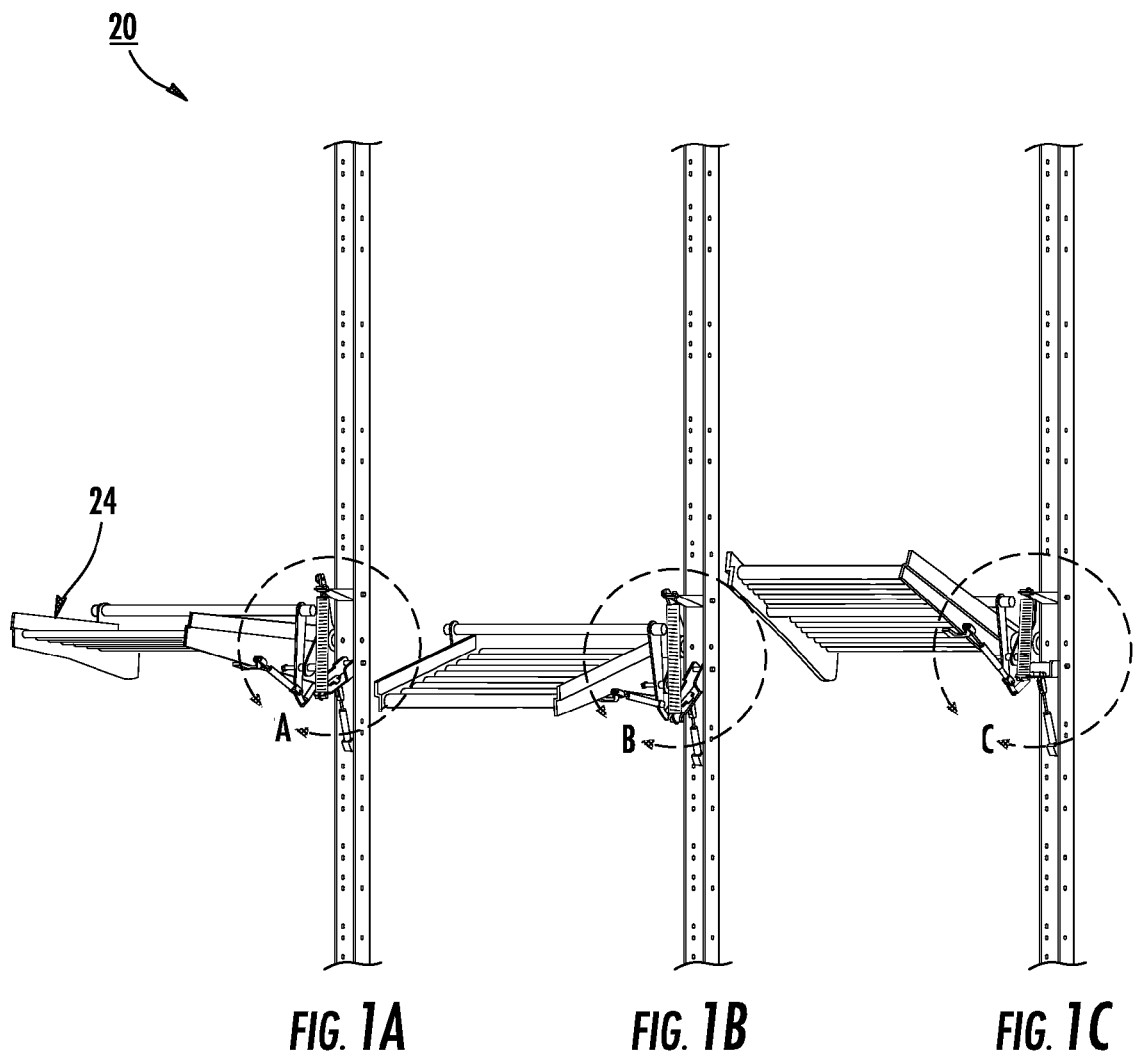
FIG. 1 (A-C) is a perspective view of a shelf assembly according to the invention.
Figure 2A:
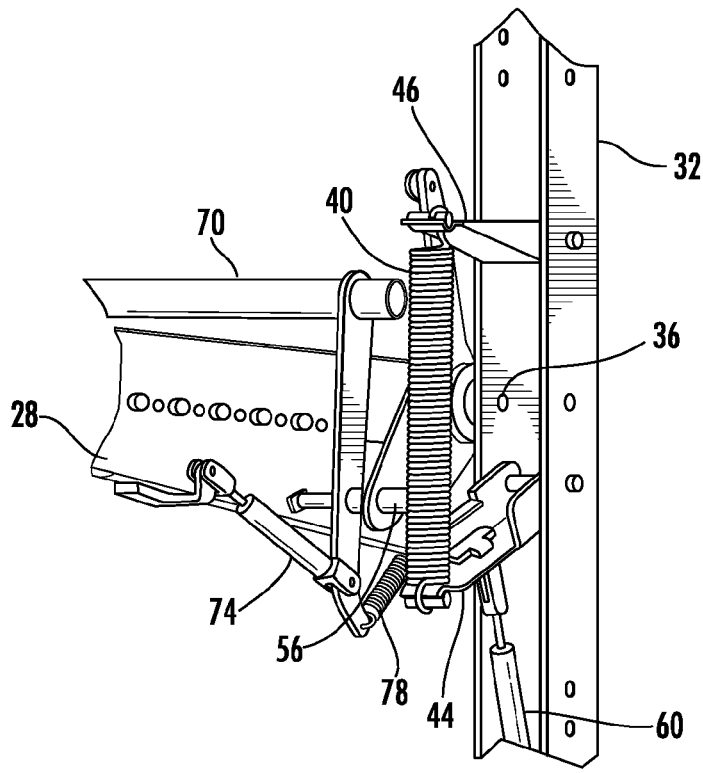
FIG. 2 (A-C) is an enlarged perspective view of areas A-C in FIG. 1.
Figure 2B:
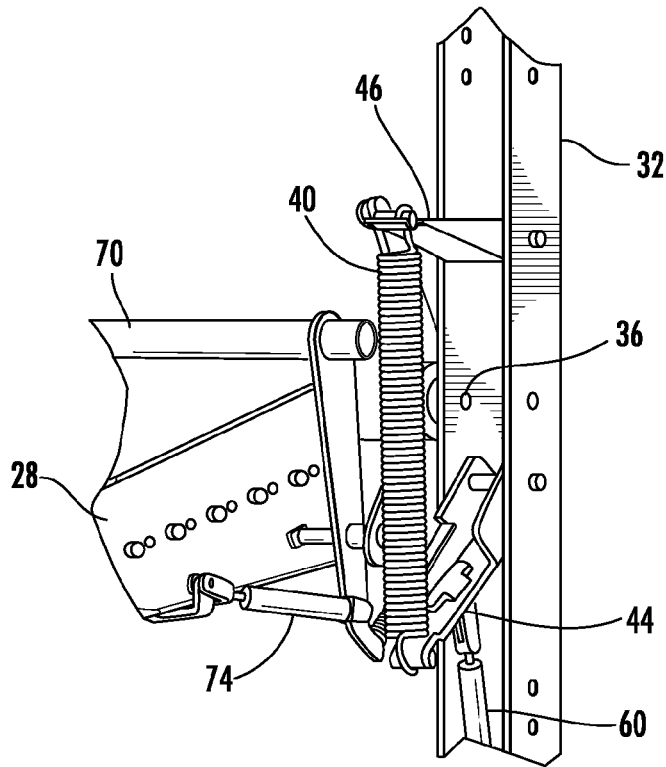
Figure 2C:
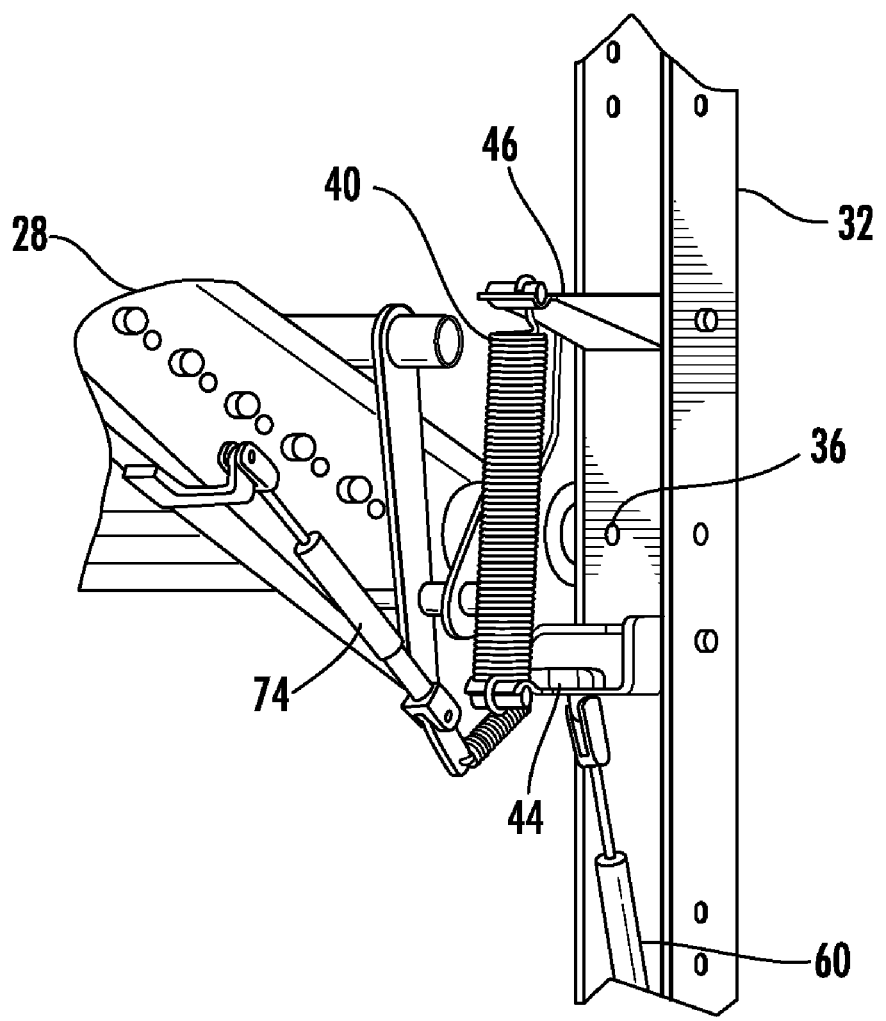
Figures 3A, 3B, 3C:
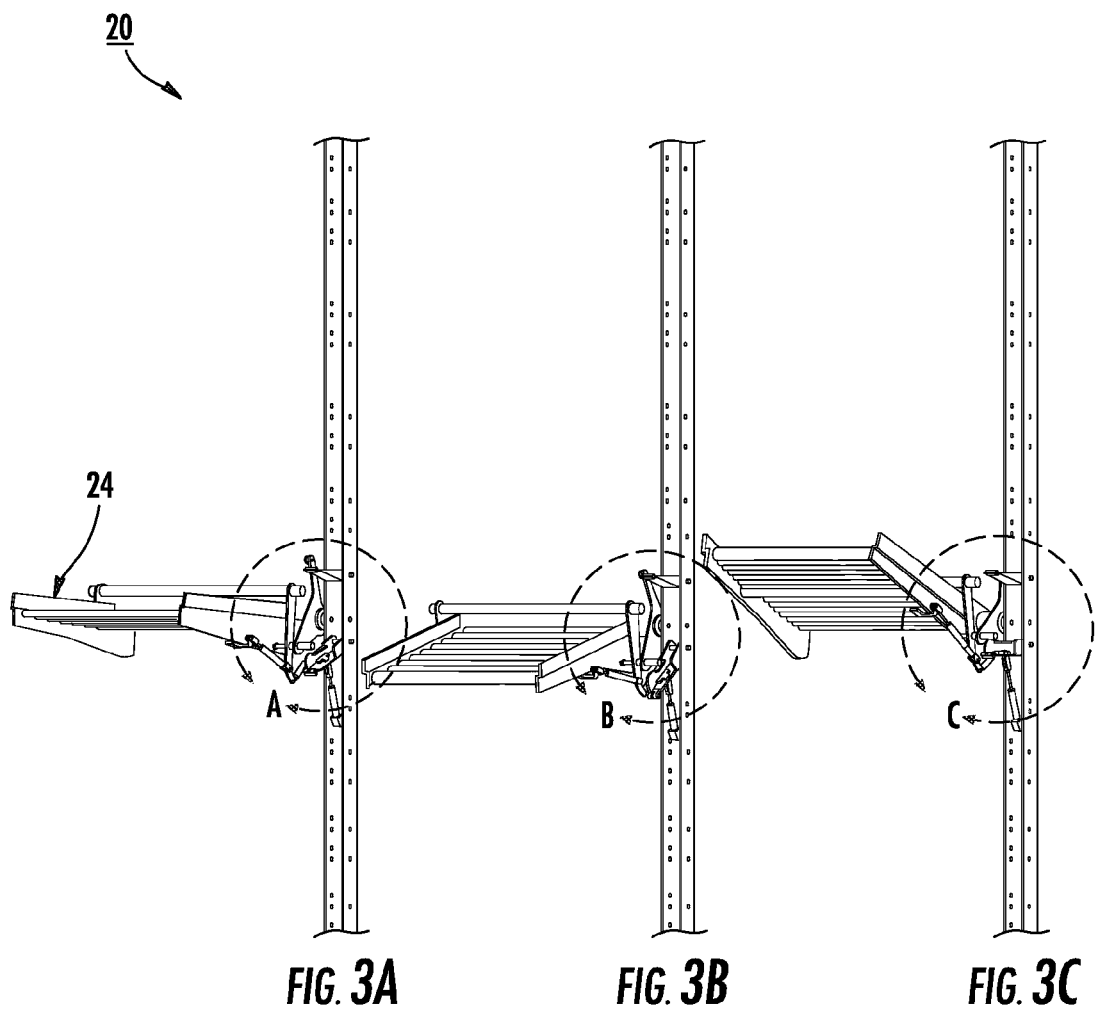
FIG. 3 (A-C) is a perspective view of a shelf assembly according to the invention in differing modes of operation, with a biasing spring removed to reveal features.
Figure 4A:
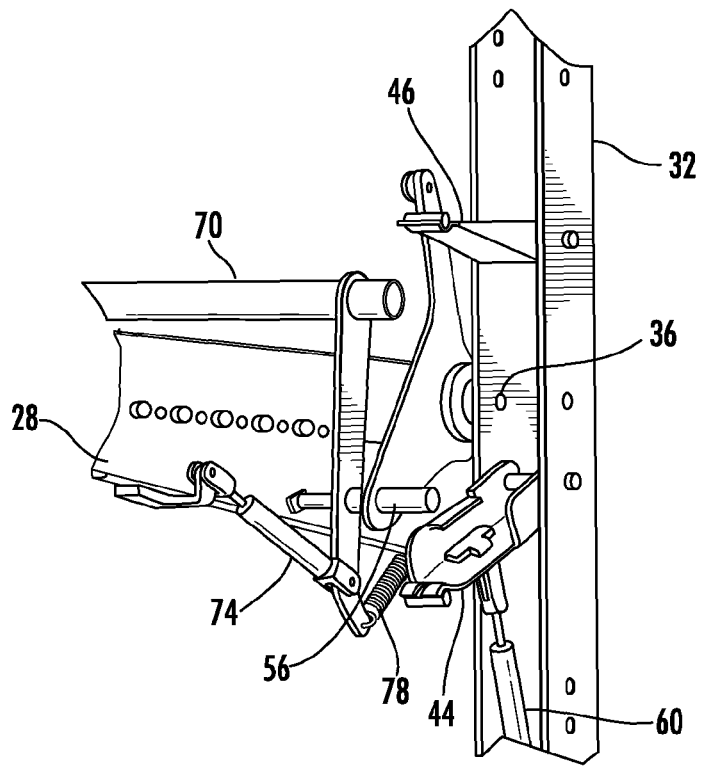
FIG. 4 (A-C) is an enlarged perspective view of areas A-C in FIG. 3.
Figure 4B:
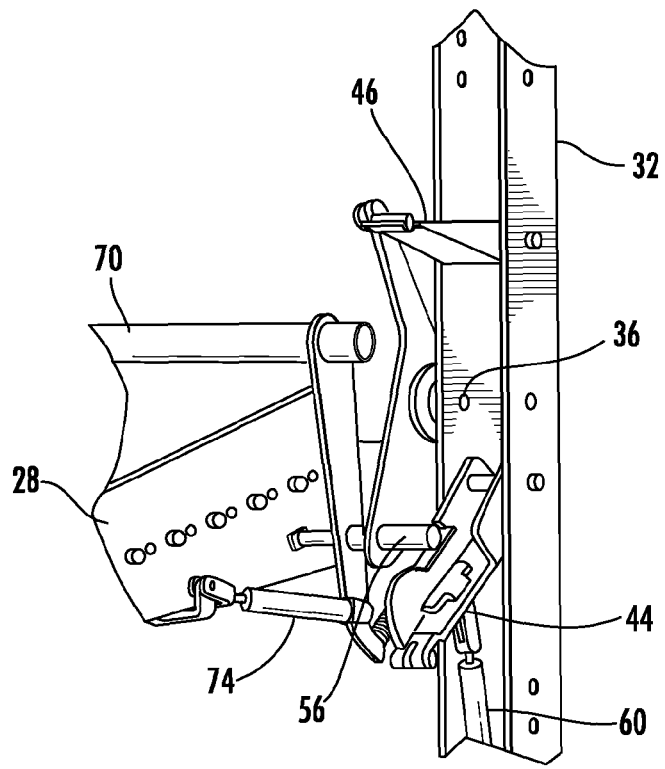
Figure 4C:
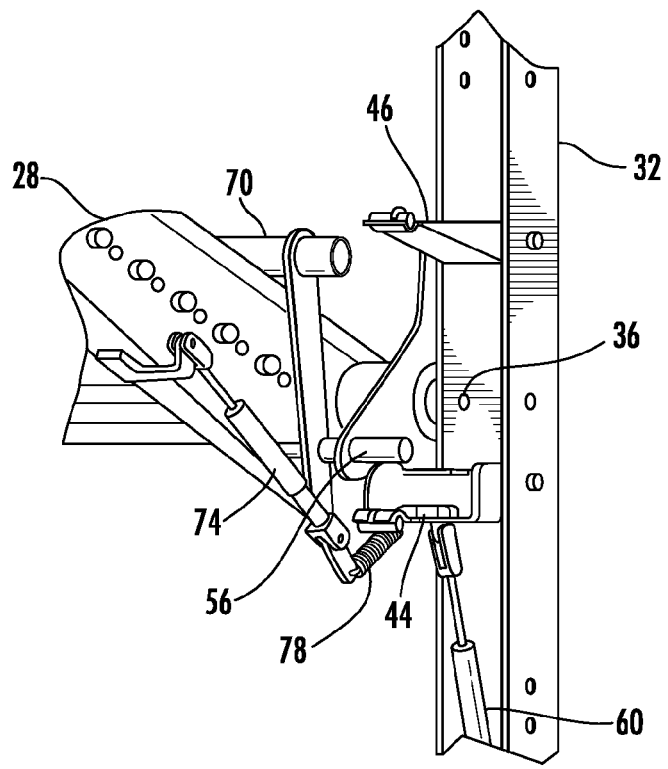
Figure 5:
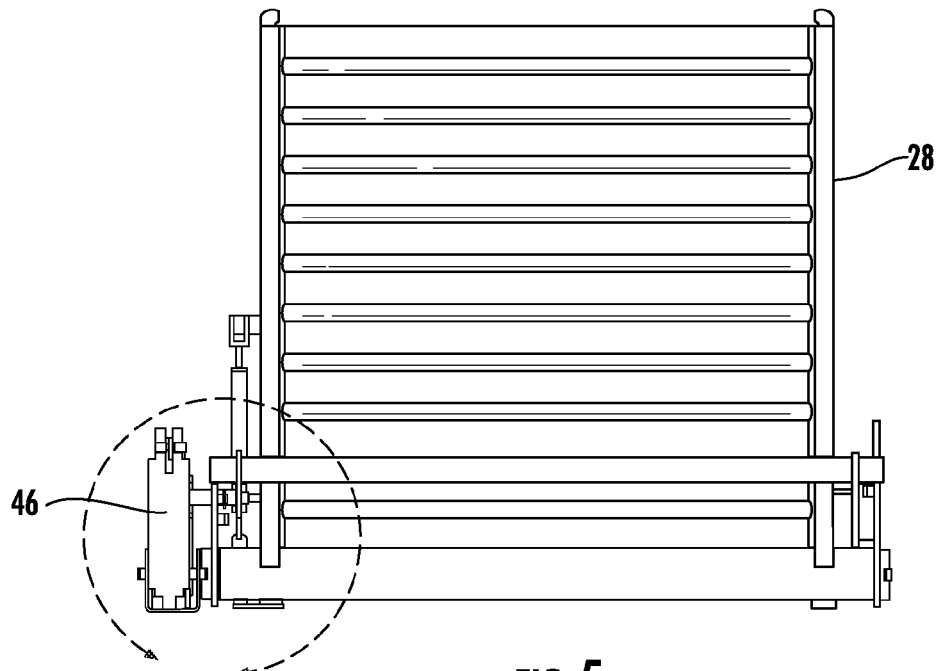
FIG. 5 is a top plan view of a shelf assembly according to the invention.
Figure 6:
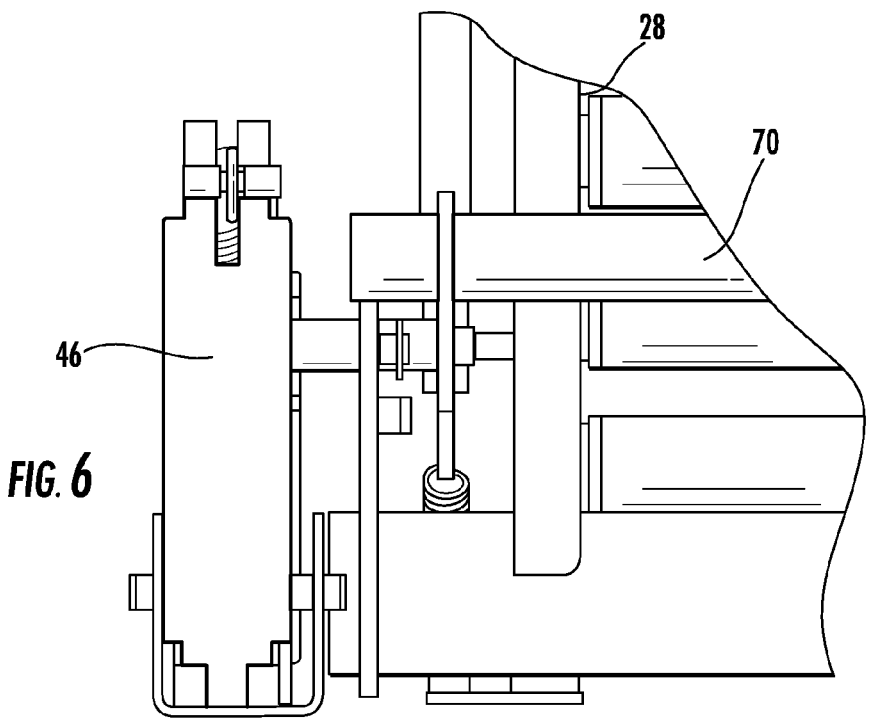
FIG. 6 is an enlarged view of area A in FIG. 5.
Figure 7:
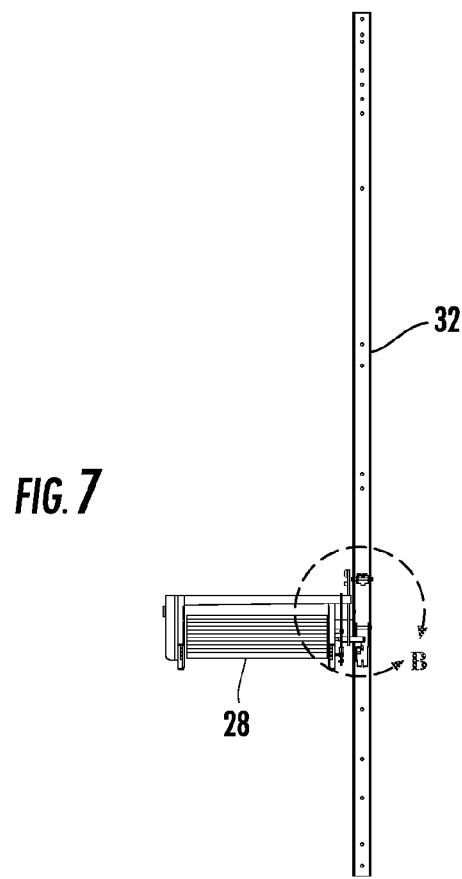
FIG. 7 is a front elevation of a shelf assembly according to the invention with a biasing spring removed to reveal features.
Figure 8:
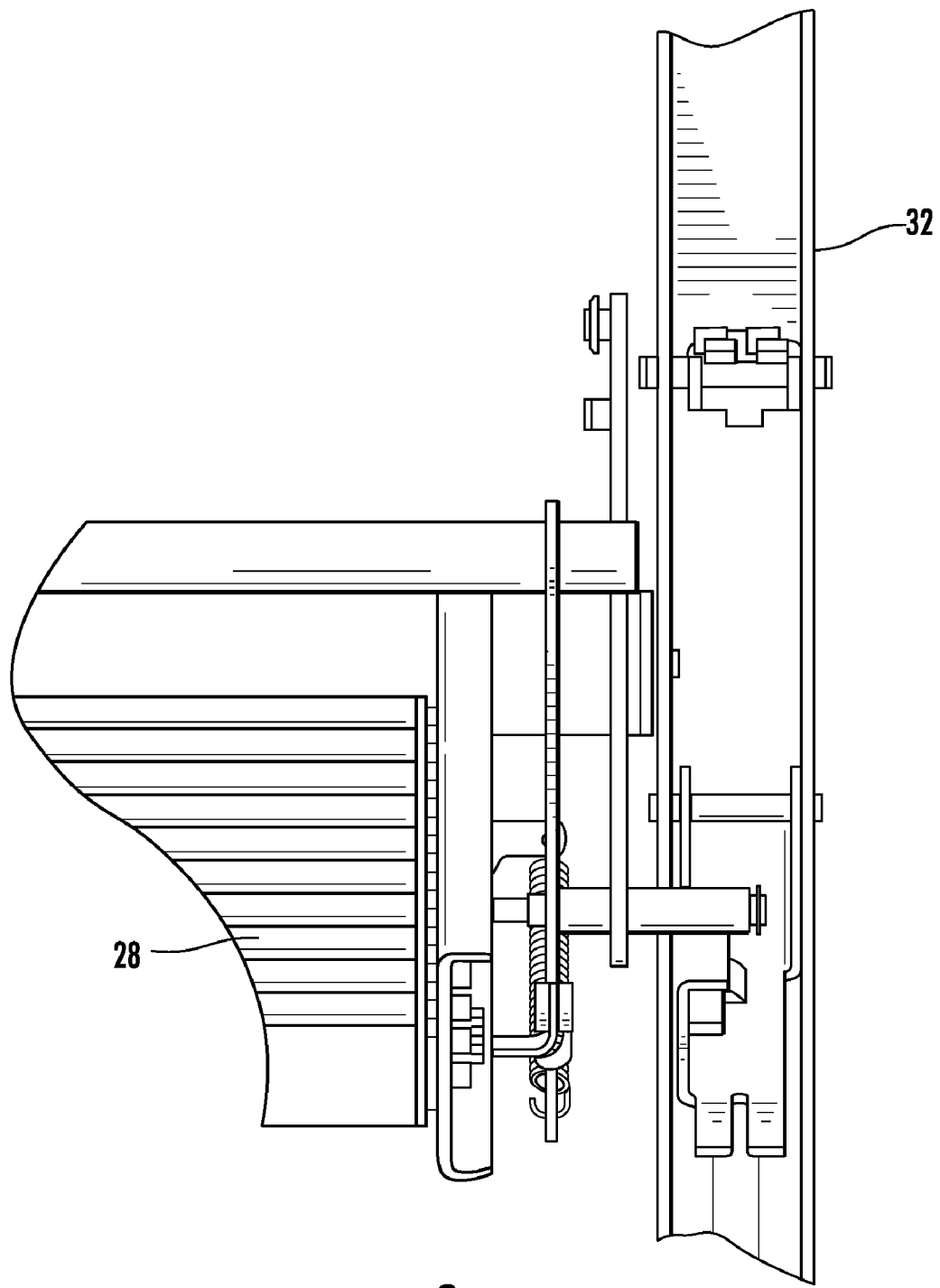
FIG. 8 is an enlarged view of area B in FIG. 7.
Figure 9:
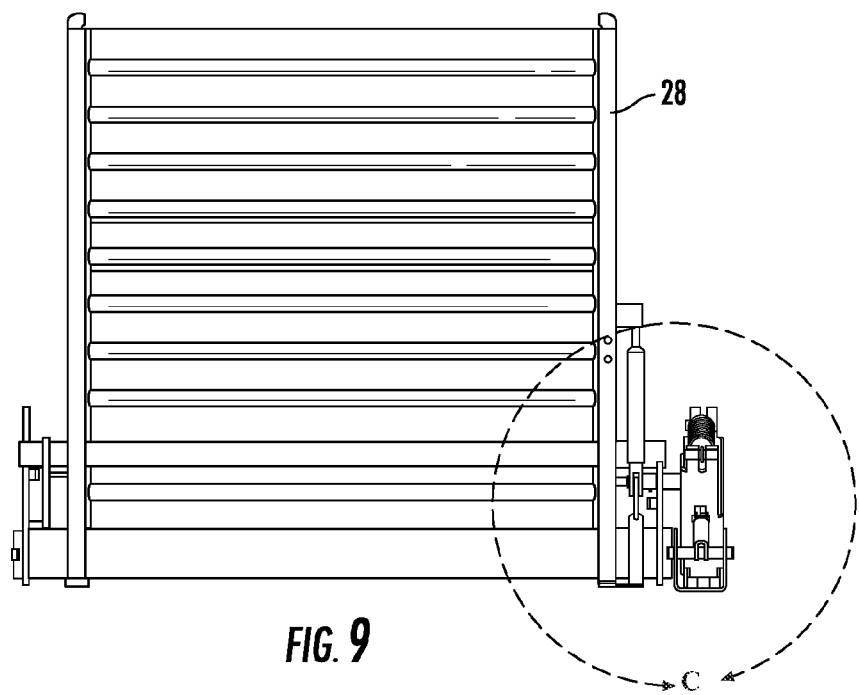
FIG. 9 is a bottom plan view of a shelf assembly according to the invention.
Figure 10:
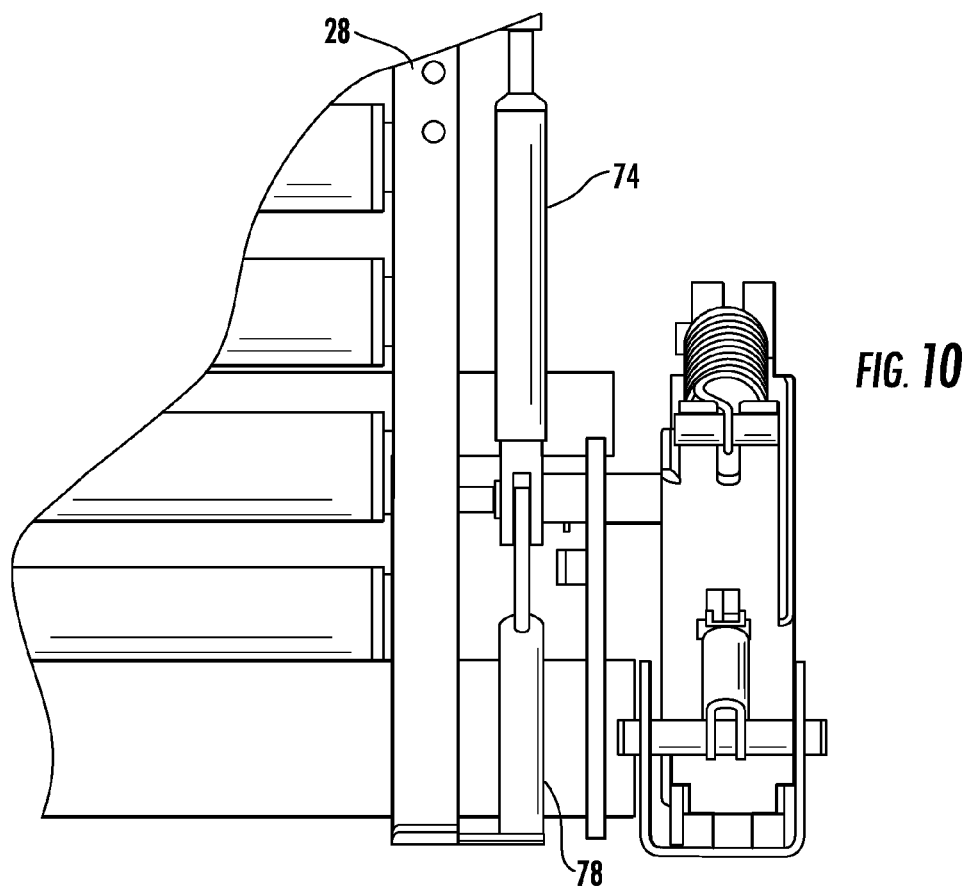
FIG. 10 is an enlarged bottom view of area C in FIG. 9.
Figure 11:
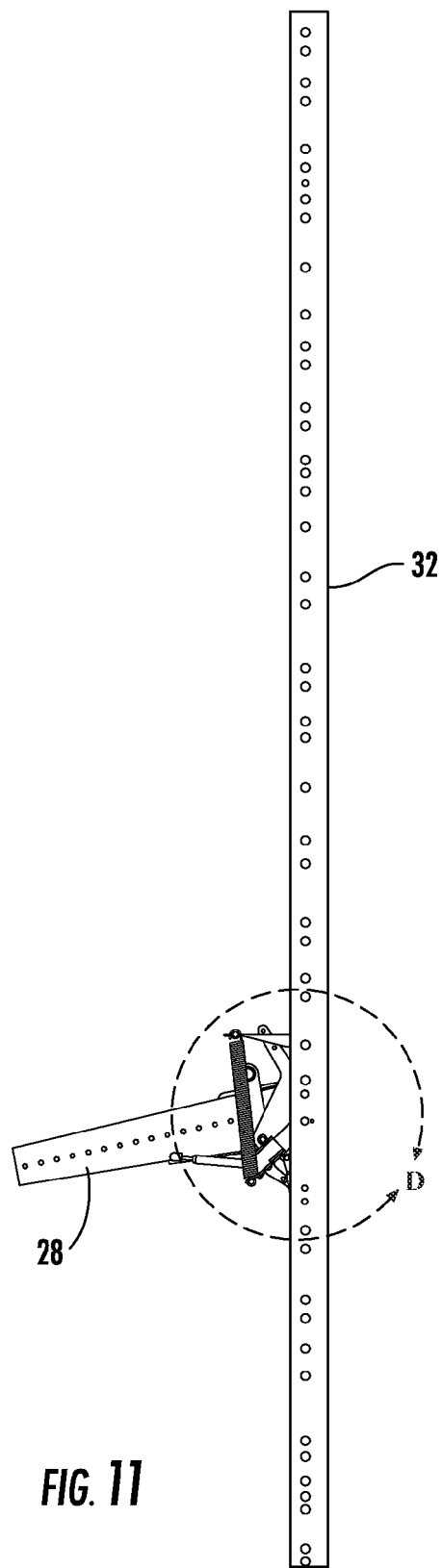
FIG. 11 is a side elevation of a shelf assembly according to the invention.
Figure 12:
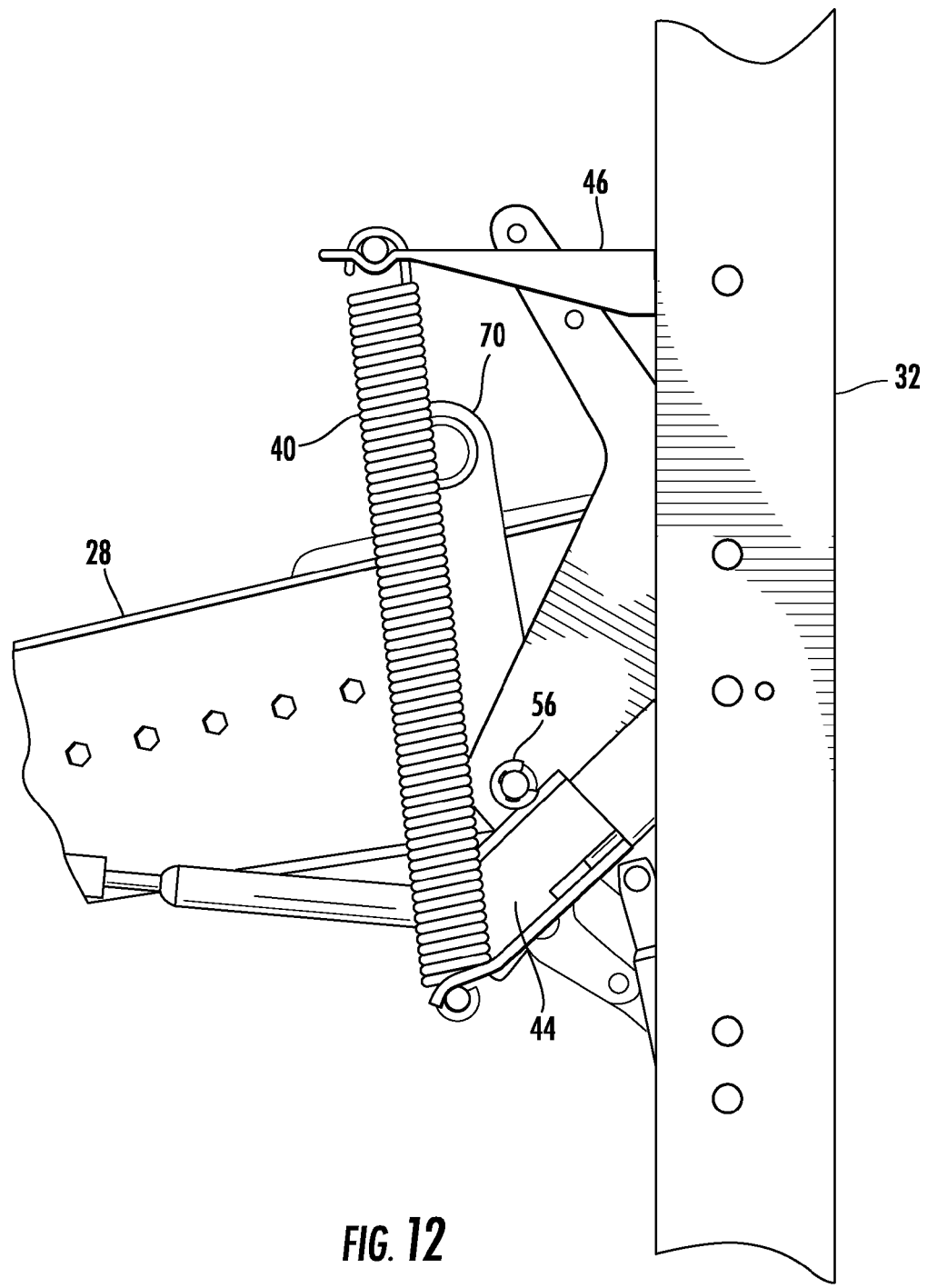
FIG. 12 is an enlarged view of area D in FIG. 11.
Figure 13:
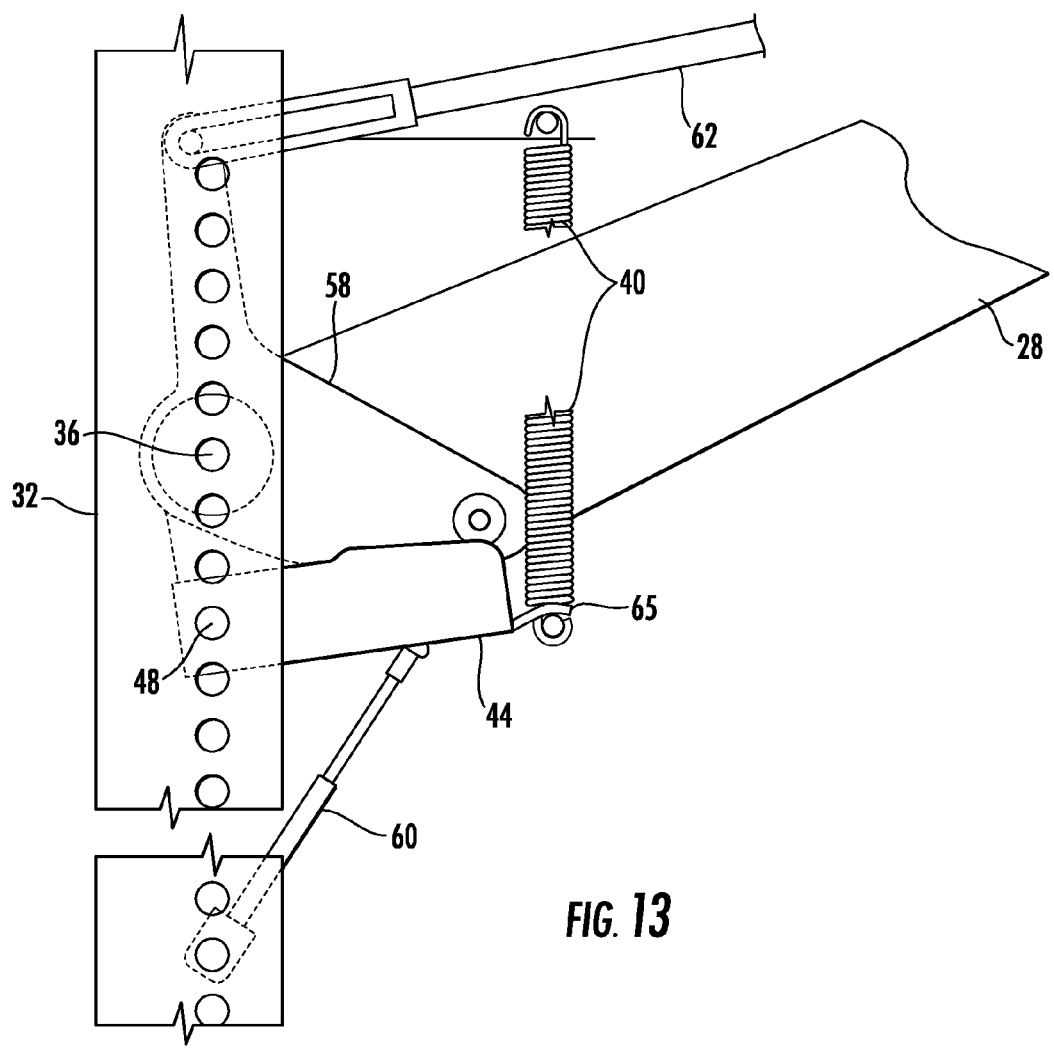
FIG. 13 is a side elevation of a shelf assembly, partially broken away and partially in phantom, in a first mode of operation.
Figure 14:
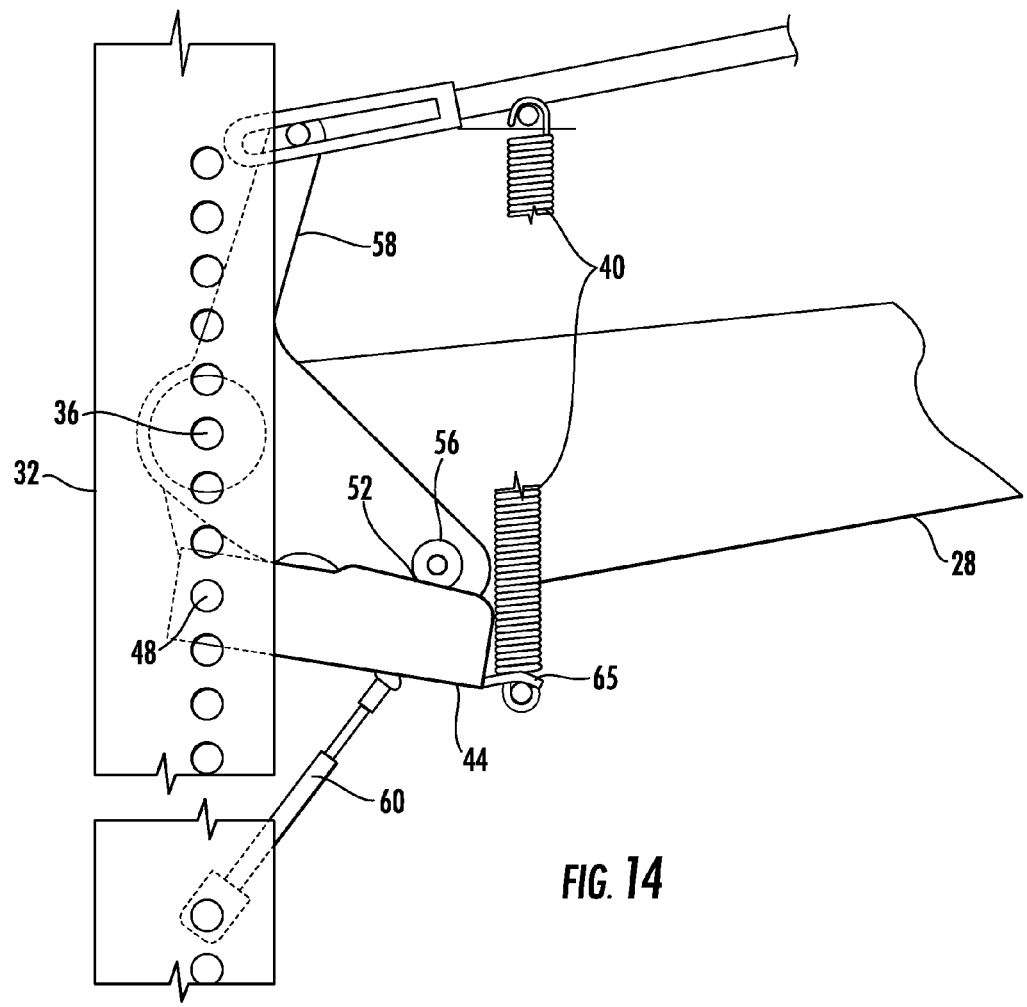
FIG. 14 is a side elevation, partially broken away and partially in phantom, of a shelf assembly in a second mode of operation.
Figure 15:
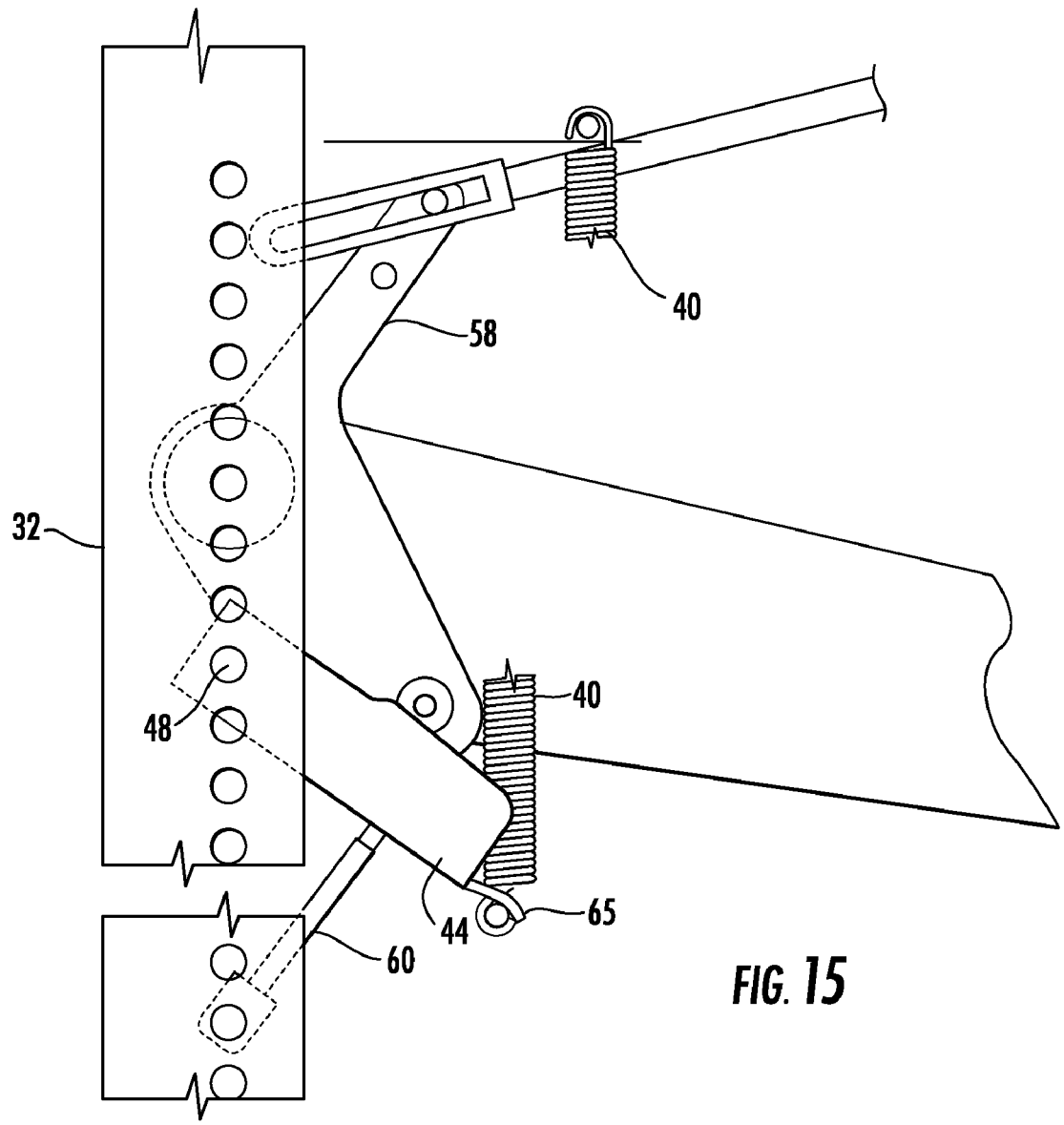
FIG. 15 is a side elevation, partially broken away and partially in phantom, in a third mode of operation.

There is shown in FIGS. 1-15 a container storage and retrieval system 20 which comprises a plurality of shelf tray assemblies 24. Each shelf tray assembly 24 includes a shelf tray 28 that is pivotally mounted to a support 32 about a pivot pin 36.

Spring 40 is provided to urge shelf 28 to the upwardly tilted position shown in FIGS. 1C, 2C, 3C and 4C. Spring 40 can be a metal coil spring as shown. Other spring types, including elastic polymeric bands and cords, or other forms of metal springs, such as leaf springs, can alternatively be utilized. It is also possible to provide the spring elsewhere in the shelf tray assembly. For example, the spring could be positioned at the rear of the shelf tray 28 and act to rotate the shelf tray about the pivot pin 36. Such a spring could be a coil spring or a leaf spring. Other constructions are possible. The strength of the springs can vary depending on the size and construction of the trays 28, and also upon the size and weight of containers that will be stored on the trays. In one embodiment for smaller containers, the spring is about 9.3 lbf/in, and for larger containers is about 12.6 lbf/in. In another embodiment the spring strength is between about 6 and about 17 lbf/in.

The spring 40 can be mounted between the support 32 and the tray 28 in a variety of ways. A spring seat 46 can be mounted to the support structure 32 in order to retain an upper end of the spring 40. The bottom end of the spring 40 can be connected directly to the tray 28. In the embodiment shown, the bottom end of the spring 40 is connected to a tray return cam 44 that is pivotally mounted to the support 32 about a pivot pin 48. The tray return cam 44 can have an extension lever 65 for attaching to the spring. The tray return cam 44 has a cam ledge 52 for acting on a cam follower 56. The cam follower 56 can be mounted to the shelf tray 28, but in the embodiment shown is mounted to a transfer linkage bracket

58. The transfer linkage bracket 58 has a transfer linkage 62 which acts to permit lowering of a shelf tray only when the next lower shelf tray is in the receiving position. Spring 40 thereby acts to lift the tray return cam 44 so as to urge the cam ledge 52 against the cam follower 56. This will cause the shelf tray 28 to move from the downwardly tilted position (FIG. 1B) to the upwardly tilted position (FIG. 1C). The action of the spring 40 on the tray return cam 44 and thereby the cam follower 56 creates a lever action which assists in raising the tray 28 and allows for a weaker spring 40 than would otherwise be required. As is known in such systems, the shelf tray assemblies can be constructed so as to also provide a substantially horizontal storage position (FIG. 1A).

The action of the spring 40 on the shelf tray 28 can cause vibrations and jarring. Dampening structure can be provided to dampen the movement of the shelf tray 28 under the influence of the spring 40. Any suitable dampening structure can be provided. In the embodiment shown, a bi-directional damper is provided in the form of a shock absorber such as a fluid cylinder 60. Other dampening structure is possible, for example, a torsion damper about or in the vicinity of the pivot pin 36, or a fluid bearing constructed to dampen movement of the tray. In some instances, dampening structure may not be necessary, such as when the spring strength and container weight are such that jarring of the tray will not occur. The dampening cylinder 60 is connected between the support 32 and the tray return cam 44. Other connections of the dampening cylinder are possible. It is also possible to utilize two uni-directional dampening devices, connected so as to apply dampening forces to the tray in opposing directions. As the tray 28 moves upward under the influence of the spring 40, the damper 60 will act on the tray return cam 44 against the action of the spring 40. Also, as the tray 28 falls under the weight of the container, the bi-directional damper 60 will act on the tray return cam 44 to reduce jarring and vibrations of the shelf tray 28.

A container arresting arm 70 can be provided to engage containers on the shelf tray 28. The container arresting arm 70 is operatively connected to a fluid cylinder 74 and biasing spring 78 to dampen the motion of the container arresting arm 70 as it is struck by a container moving through the tower and onto the shelf tray 28. Other dampening structure is possible.

This invention can be embodied in other forms without departing from the spirit or essential attributes thereof and, accordingly, reference should be had to the following claims rather than the foregoing specification as indicating the scope of the invention.

We claim:

1. A vertically accumulating storage and retrieval apparatus comprising:
a first plurality of substantially vertically spaced shelf assemblies supported by support structure; and
a second plurality of substantially vertically spaced shelf assemblies supported by support structure, each of said shelf assemblies including:
a shelf tray for receiving, storing, and discharging containers, the shelf trays of the first plurality of shelf assemblies being substantially staggered vertically relative to the shelf trays of the second plurality of shelf assemblies, with free ends of the shelf trays of each plurality of shelf assemblies facing the free ends of the other plurality of shelf assemblies, each shelf tray being mounted to its respective vertical support for pivotal movement between an upwardly tilted receiving position and a downwardly tilted discharge position;
spring biasing structure for urging the shelf tray to the receiving position; and
a transfer control operatively connected to the shelf tray and having a lock position retaining the shelf tray when a shelf tray of a next lower shelf assembly is not prepared to receive a container, and a release position allowing the shelf tray to move to the discharge position under the weight of a container disposed on said shelf tray when the shelf tray of the next lower shelf assembly is prepared to receive a container.

2. The vertically accumulating storage and retrieval apparatus of claim 1, further comprising dampening structure for dampening the movement of said shelf tray.

3. The vertically accumulating storage and retrieval apparatus of claim 2, wherein said dampening structure dampens the movement of said shelf tray to said upwardly tilted receiving position.

4. The vertically accumulating storage and retrieval apparatus of claim 2, wherein said dampening structure dampens the movement of said shelf tray to said downwardly tilted discharge position.

5. The vertically accumulating storage and retrieval apparatus of claim 2, wherein said dampening structure is bi directional.

6. The vertically accumulating storage and retrieval apparatus of claim 1, further comprising a transfer control linkage operatively connected between the transfer control and the next lower shelf assembly for transitioning the transfer control to the release position when the next lower shelf tray is prepared to receive a container.

7. The vertically accumulating storage and retrieval device of claim 2, wherein said dampening structure is a fluid cylinder.

8. The vertically accumulating storage and retrieval apparatus of claim 1, wherein said spring is a metal coil spring.

9. The vertically accumulating storage and retrieval apparatus of claim 1, wherein said spring is an elastic polymeric spring.

10. The vertically accumulating storage and retrieval apparatus of claim 1, further comprising a tray return cam, said tray return cam being pivotally mounted to said support structure, and a cam follower, said cam follower being operatively connected to said shelf tray.

11. The vertically accumulating storage and retrieval apparatus of claim 10, further comprising dampening structure, wherein said dampening structure is connected to said tray return cam, and extends from a bottom portion of said tray return cam to said support structure.

12. The vertically accumulating storage and retrieval apparatus of claim 2, wherein said dampening structure is connected to said shelf tray and to said support structure.

13. A method for storing and retrieving containers, comprising the steps of:
providing a vertically accumulating storage and retrieval apparatus, comprising a first plurality of substantially vertically spaced shelf assemblies supported by support structure and a second plurality of substantially vertically spaced shelf assemblies supported by support structure, each of said shelf assemblies including a shelf tray for receiving, storing, and discharging containers, the shelf trays of the first plurality of shelf assemblies being substantially staggered vertically relative to the shelf trays of the second plurality of shelf assemblies, with free ends of the shelf trays of each plurality of shelf assemblies facing the free ends of the shelf trays of the other plurality of shelf assemblies, each shelf tray being mounted to its respective vertical support for pivotal movement between an upwardly tilted receiving position and a downwardly tilted discharge position;

moving a shelf tray to the receiving position with spring biasing;
dampening the movement of said shelf tray between said upwardly tilted receiving position and said downwardly tilted discharge position;
retaining the shelf tray when a shelf tray of a next lower shelf assembly is not prepared to receive a container, and allowing the shelf tray to move to the discharge position under the weight of a container disposed on said shelf tray when the shelf tray of the next lower shelf assembly is prepared to receive a container.

* * * * *